(12) United States Patent
Arikawa (10) Patent No.: US 10,830,352 B2
(45) Date of Patent: Nov. 10, 2020

(54) BELLOWS

(71) Applicant: Eagle Industry Co., Ltd., Tokyo (JP)

(72) Inventor: Tatsuhiro Arikawa, Tokyo (JP)

(73) Assignee: EAGLE INDUSTRY CO., LTD.

( * ) Notice: Subject to any disclaimer, the term of this patent is extended or adjusted under 35 U.S.C. 154(b) by 0 days.

(21) Appl. No.: 16/487,786

(22) PCT Filed: Feb. 26, 2018

(86) PCT No.: PCT/JP2018/006927
§ 371 (c)(1),
(2) Date: Aug. 21, 2019

(87) PCT Pub. No.: WO2018/159523
PCT Pub. Date: Sep. 7, 2018

(65) Prior Publication Data
US 2020/0232559 A1    Jul. 23, 2020

(30) Foreign Application Priority Data

Mar. 2, 2017   (JP) .................................. 2017-039652

(51) Int. Cl.
*F16J 3/04* (2006.01)
*F16J 15/52* (2006.01)
*B29L 31/00* (2006.01)

(52) U.S. Cl.
CPC ............... *F16J 3/047* (2013.01); *F16J 15/52* (2013.01); *B29L 2031/703* (2013.01);
(Continued)

(58) Field of Classification Search
CPC .......................... F16J 3/047; F15B 2201/3153
See application file for complete search history.

(56) References Cited

U.S. PATENT DOCUMENTS

| | | | | |
|---|---|---|---|---|
| 3,326,091 A | * | 6/1967 | Allen ....................... | F16J 3/047 92/34 |
| 4,364,252 A | * | 12/1982 | Koizumi .............. | B21D 15/105 72/57 |
| 5,176,390 A | * | 1/1993 | Lallement ............... | F16D 3/845 277/636 |
| 6,564,606 B2 | * | 5/2003 | Okada .................... | B21D 15/10 29/454 |

(Continued)

FOREIGN PATENT DOCUMENTS

| | | | | |
|---|---|---|---|---|
| CN | 2775404 | | 4/2006 | ................. F16J 3/04 |
| EP | 0464984 | | 1/1992 | ................. F16J 3/04 |

(Continued)

OTHER PUBLICATIONS

International Preliminary Report on Patentability (w/translation) issued in application No. PCT/JP2018/006927, dated Sep. 3, 2019 (11 pgs).

(Continued)

*Primary Examiner* — Thomas E Lazo
(74) *Attorney, Agent, or Firm* — Hayes Soloway P.C.

(57) ABSTRACT

A bellows excellent in durability has an accordion shape where crest parts with U-shaped cross sections and trough parts with U-shaped cross sections are repeatedly formed via slope parts, the slope parts leading to the crest part includes first portions, second portions, third portions and fourth portions which are continuously connected, in order, to one another from the crest part toward the adjacent trough parts, and in a free length state of the bellows, a separation distance between the second portions of the both slope parts is longer than separation distances between the first portions and between the third portions.

9 Claims, 6 Drawing Sheets

(52) U.S. Cl.
    CPC . *F15B 2201/205* (2013.01); *F15B 2201/3153* (2013.01); *F16J 3/048* (2013.01)

(56) References Cited

U.S. PATENT DOCUMENTS

| 7,399,372 | B2* | 7/2008 | Okada | C21D 7/06 |
| | | | | 148/521 |
| 2004/0055656 | A1 | 3/2004 | Kurokawa et al. | 138/30 |
| 2016/0108935 | A1* | 4/2016 | Arikawa | F15B 1/103 |
| | | | | 92/47 |
| 2017/0307083 | A1 | 10/2017 | Sato et al. | F16J 3/047 |

FOREIGN PATENT DOCUMENTS

| JP | 2539905 | 10/1996 | F15B 1/08 |
| JP | 2000291799 | 10/2000 | F16J 3/02 |
| JP | 2003148616 | 5/2003 | B23K 26/21 |
| JP | 2004108511 | 4/2004 | B60T 17/00 |
| JP | 2005048902 | 2/2005 | F16J 3/04 |
| JP | 3202764 | 8/2011 | F16D 3/84 |
| WO | WO2016072323 | 5/2016 | F16J 15/52 |
| WO | WO-2016072323 A1 * | 5/2016 | F16J 15/52 |

OTHER PUBLICATIONS

International Search Report and Written Opinion (w/translation) issued in application No. PCT/JP2018/006927, dated May 1, 2018 (12 pgs).

Chinese First Office Action issued in related Chinese Patent Application No. 201880013027.0, dated Mar. 18, 2020 with translation (10 pages).

* cited by examiner

BELLOWS

TECHNICAL FIELD

The present invention relates to a bellows. More specifically, a bellows of the present invention relates to a metal formed bellows preferably used as a component of an on-vehicle accumulator or the like.

BACKGROUND ART

A bellows is formed in an accordion shape where crest parts with U-shaped cross sections and trough parts with U-shaped cross sections are repeatedly formed via linear or gentle curved slope parts, and it can be expanded/contracted in the axial direction (Patent Citations 1 and 2). As a bellows for an accumulator or the like, a metal formed bellows is used because of its quality stability.

As such an accumulator, there is proposed a conventional accumulator including a bellows, a movable plate having an annular seal member and fixed to one end of the bellows, and a stay on and from which the annular seal member is seated and separated, in which when the movable plate is seated on the stay, excessive deformation of the bellows is prevented by sealing a working fluid in a space formed between the bellows and the stay (Patent Citation 3).

CITATION LIST

Patent Literature

Patent Citation 1: JP 2539905 B (FIG. 3)
Patent Citation 2: JP 2005-48902 A (FIG. 3)
Patent Citation 3: JP 2004-108511 A (FIG. 2)

SUMMARY OF INVENTION

Technical Problem

However, in the techniques disclosed in Patent Citations 1 and 2, a curvature radius of the crest and trough parts with U-shaped cross sections is large and the slope parts is linear or gentle curved, therefore, there was a problem in that the length in the axial direction of the bellows in a compressed state becomes long, and the dimension in the axial direction of the accumulator becomes large in a state where the bellows is incorporated in the accumulator. Moreover, when the curvature radius of the U-shaped crest and trough parts is reduced, there was also a problem in that an oil canning phenomenon (For example, a defective phenomenon that a flat surface of a drawn product is dented on the opposite side when gently pressed, and is returned when released. A phenomenon referred to as "Beko" in Japanese or the like.) occurs and durability is reduced.

Moreover, in the technique in Patent Citation 3, in a state that a foreign matter is bitten between the annular seal member fixed to the lower part of the movable plate and the stay, a backup fluid is leaked, and differential pressure is generated between the inside and the outside of the bellows (a state that a backup fluid is leaked in a zero-down state), there was a fear that the bellows is abnormally deformed due to gas pressure within the accumulator.

The present invention has been made in view of such problems, and an object thereof is to provide a bellows excellent in durability.

Solution to Problem

In order to solve the problems, a bellows of the present invention is as follows.

A bellows according to a first aspect of the present invention is a bellows in an accordion shape where crest parts with U-shaped cross sections and trough parts with U-shaped cross sections are repeatedly formed via slope parts in a view from outside, in which adjacent two of the slope parts leading to one of the crest parts comprise first portions, second portions, third portions, and fourth portions which are continuously connected to one another from the crest part toward adjacent two of the trough parts, and in a free length state of the bellows, a separation distance between the second portions of the adjacent two of the slope parts is formed to be longer than separation distances between the first portions and between the third portions of the adjacent two of the slope parts.

According to the first aspect, since the both slope parts leading to the crest part have a shape that defines a large annular space between the second portions, the bellows is likely to be deformed starting at an inflection point of the second portions of the slope parts when the bellows is expanded and contracted, the crest parts are less likely to open and close, and thus the bellows is excellent in durability. Moreover, since the crest parts are hardly to be deformed when the bellows is expanded and contracted or even if differential pressure is generated between the inside and the outside of the bellows, durability of the crest parts can be improved.

In the bellows according to the first aspect, the first portions may be close to each other than the distance between the third portions. In this case, since the first portions of the adjacent slope parts are arranged close to each other in the axis of the bellows, curvature radiuses of the crest parts can be reduced and the crest parts are less likely to be deformed.

In the bellows according to the first aspect, the second portions may best provided on an outer diameter side than an effective diameter of the slope part in this case, an expansion and contraction margin of the bellows can be secured larger, and the durability of the crest parts is excellent.

In the bellows according to a second aspect of the present invention, the second portions of the adjacent two of the slope parts have slant elements inclined with respect to the first apportions and the third portions and extending in a same direction so that an annular space partially defined by the slant elements.

According to the second aspect, since the slant elements of the second portions of the adjacent slope parts extend in the same direction, the separation distances between the first portions and between the third portions are not too long, and the separation distance of the adjacent slope parts can be set smaller. As a result, tips of the crest parts when the bellows contracts is prevented from being brought into contact with each other, and a close contact area of the slope parts can be reduced. Moreover, it is possible to reduce the curvature radiuses of the crest parts, and rigidity of the crest parts can be enhanced. Further, it can be ensured that the inflection point on the trough part side acts as a base point of deformation when the bellows is expanded and contracted.

In the bellows according to the second aspect, one end of the slant element continuous to the crest part side may be located on the outer diameter side than the other end of the slant member continuous to the trough part. In this case, since the vicinities of the inflection points of the both ends of the slant element are formed in gentle obtuse angles, durability of the bellows when it is expanded and contracted is excellent.

In the bellows according to the third aspect of the present invention, curvatures of both ends of each of the slant elements are reversed. In this case, the distance of the adjacent slope parts can be set even smaller.

In the bellows according to third aspect, linear straight line elements may be formed to continuously extend from the both ends of the slant element. In this case, the distance of the adjacent slope parts can be set even smaller.

In the bellows according to the third aspect, the straight line elements on the crest part side of the adjacent slope parts may be parallel to each other. In this case, the distance of the adjacent slope parts can be set even smaller, and the rigidity of the crest parts can be enhanced by reducing the curvature radius of the crest parts.

In the bellows according to the third aspect, a separation distance of the straight line elements on the trough part side of the adjacent slope parts may be gradually increased toward the trough part side. In this case, since the bellows is likely to be deformed in the vicinity of the inflection point between the slant element and the straight line element on the slope part side when it is compressed, the crest parts are less likely to be deformed.

In the bellows according to a fourth aspect of the present invention, each of the crest parts is formed by being folded 180 degrees.

According to the fourth aspect, since the first portions of the adjacent slope parts are parallel to each other, the separation distance between the first portions is short and the rigidity of the crest parts is enhanced, and a so-called wedge action is less likely to occur even if pressure acts from the interior of the bellows and the crest parts are less likely to open.

In the bellows according to a fifth aspect of the present invention, the crest part is provided at a position offset with respect to a center position between the adjacent two of the trough parts on both sides of the crest part.

According to the fist aspect, not only the whole slope part is bent in the axial direction when an impact force acts on the crest parts, but also the third portion is likely to be bent because the distance between the third portions of the slope parts is short, and an impact on the crest parts in a case where the crest parts are abutted by a shell or the like of an opposing accumulator can be mitigated.

In the bellows according to the sixth aspect of the present invention, the crest part is provided at a position offset with respect to a center position between the adjacent tow of the trough parts on both sides of the crest parts, and the slant elements are inclined in a direction which assists an offset of the crest part.

According to the sixth aspect, the second portion of the slope part also is likely to be bent in the axial direction when an impact force acts on the crest parts.

In the bellows according to a seventh aspect of the present invention is used for an accumulator in which a bellows cap whose one end is fixed to a housing and whose other end has a seal member is connected, and an interior of the housing is partitioned in a sealed state between the inside and the outside of the bellows.

According to the seventh aspect, durability of the bellows of the accumulator is excellent.

BRIEF DESCRIPTION OF DRAWINGS

FIG. 4 is a diagram illustrating a situation where a crest part of the bellows of the first embodiment strikes an opposing wall of a shell or the like.

FIG. 5A is a diagram showing a free length state of the bellows. FIG. 5B is a diagram showing a middle state of compression of the bellows, and FIG. 5C is a diagram showing a close-contact state of the bellows.

DESCRIPTION OF EMBODIMENTS

The point of the present invention is to reduce a curvature radius of crest parts of a bellows as much as possible. The inventors, by devising a shape of both slope parts, have made findings that a bellows excellent in durability is obtained by forming a small arc shape on the crest part according to setting.

Hereinafter, modes for carrying out the present invention will be described illustratively based on embodiments.

First Embodiment

Figure 1:
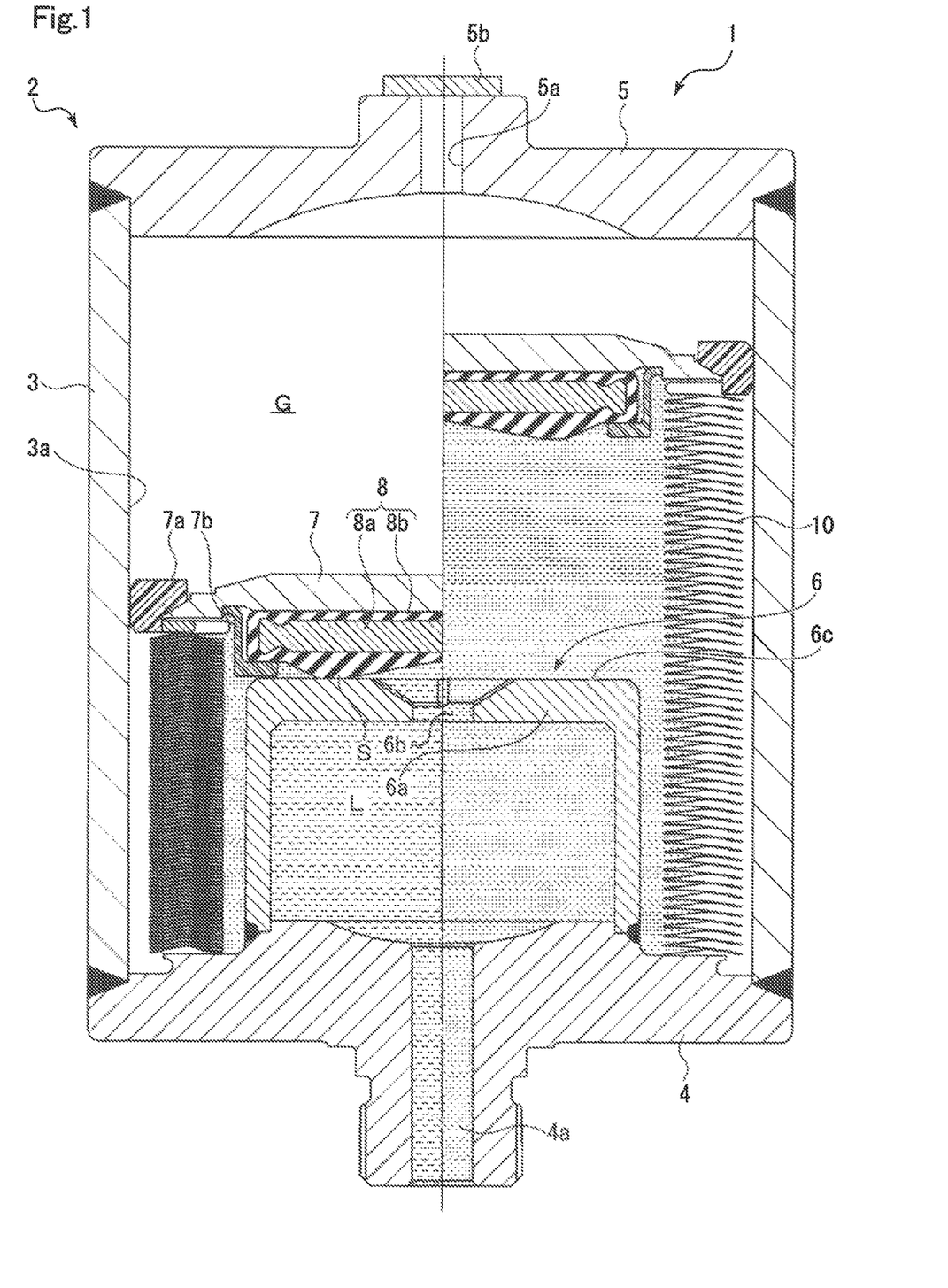
FIG. 1 is a cross-sectional view showing a configuration of an accumulator including a bellows according to a first embodiment of the present invention, in which a state that the bellows is contracted is shown on the left side, and a state that the bellows is extended is shown on the right side.

Referring to FIG. 1, an accumulator 1, in which a bellows 10 provided in a housing 2 expands and contracts in response to fluid pressure, is used, for example, in a hydraulic system for motor vehicle, a hydraulic system for industrial equipment or the like, as a pressure accumulation device, a pulsation damping device or the like. Hereinafter, a description will be made by assuming an oil port side and a gas filling port side of the accumulator 1 as a lower side and an upper side, respectively.

The housing 2 is composed of a cylindrical shell 3 whose both ends are opened, an oil port member 4 which is welded and fixed thereto so as to close the lower end of the shell 3, and a gas filling member 5 which is welded and fixed thereto so as to close the upper end of the shell 3.

In the gas filling member 5, a gas filling port 5a for injecting high pressure gas (for example, nitrogen gas) into a gas chamber G formed in the housing 2 is provided. The gas filling port 5a is closed with a gas plug 5b after injection of high pressure gas.

In the oil port member 4, a liquid gateway 4a for performing inflow and outflow of liquid (for example, hydraulic oil) from a pressure piping (not shown) in the housing 2 is provided.

A stay 6 is formed in a cup shape provided with a through-hole 6b in the center of a bottom plate part 6a, and is liquid-tightly welded and fixed to the oil port member 4.

The bellows 10 (described later in detail) is liquid-tightly welded and fixed to a bellows cap 7 at its upper end and is liquid-tightly welded and fixed to the oil port member 4 at its lower end. To the disc-shaped bellows cap 7, a guard ring 7a is attached, the bellows 10 is protected so as not to directly contact against an inner wall surface 3a of the shell 3, and the bellows 10 can smoothly expand and contract.

Moreover, to the lower portion of the bellows cap 7, a disc-shaped seal member 8 is attached and fixed with a seal holder 7b. The seal member 8 is configured by vulcanization-bonding a rubber-like elastic body 8b to a part or all of a surface of a metallic base material 8a forming a disc shape.

An interior space of the housing 2 is partitioned in a sealed state by the bellows 10 and the bellows cap 7 into the gas chamber G and a liquid chamber L. In the gas chamber G formed outside the bellows 10 and the bellows cap 7, high pressure gas injected through the gas filling port 5a is enclosed. Moreover, to the liquid chamber L formed inside the bellows 10 and the bellows cap 7, liquid from the pressure piping flows in and out via the liquid gateway 4a.

The accumulator 1 performs, by expansion and contraction of the bellows 10 provided in the housing 2, pressure regulation by moving the bellows cap 7 to a predetermined position and balancing gas pressure in the gas chamber G and liquid pressure in the liquid chamber L.

Specifically, when the pressure of the liquid in the pressure piping is reduced, the bellows cap 7 moves downward upon receiving the gas pressure in the gas chamber G and the bellows 10 is compressed, the seal member 8 attached to the bellows cap 7 and an outer surface 6c of the stay 6 come into close contact with each other to form an annular seal part S, and then the liquid gateway 4a side is closed (See, the left side of FIG. 1. This state is referred to as a "zero-down state"). Thereby, a part of liquid, specifically liquid between an inner surface of the bellows 10 and the outer surface of the stay 6, is confined with the seal part S within the liquid chamber L, and pressure of the confined liquid and gas pressure in the gas chamber G are balanced, and therefore stress due to excessive differential pressure does not act on the bellows 10 and the bellows 10 is less likely to be damaged.

On the other hand, when the pressure of the liquid in the pressure piping is increased, the seal member 6 attached to the bellows cap 7 is separated from the outer surface 6c of the stay 6 upon receiving the liquid pressure in the liquid chamber L, the bellows cap 7 moves upward, and the bellows 10 is expanded and held in a position where the gas pressure and the liquid pressure are balanced (See, the right side of FIG. 1.).

Next, the bellows 10 will be described.

Figure 2:
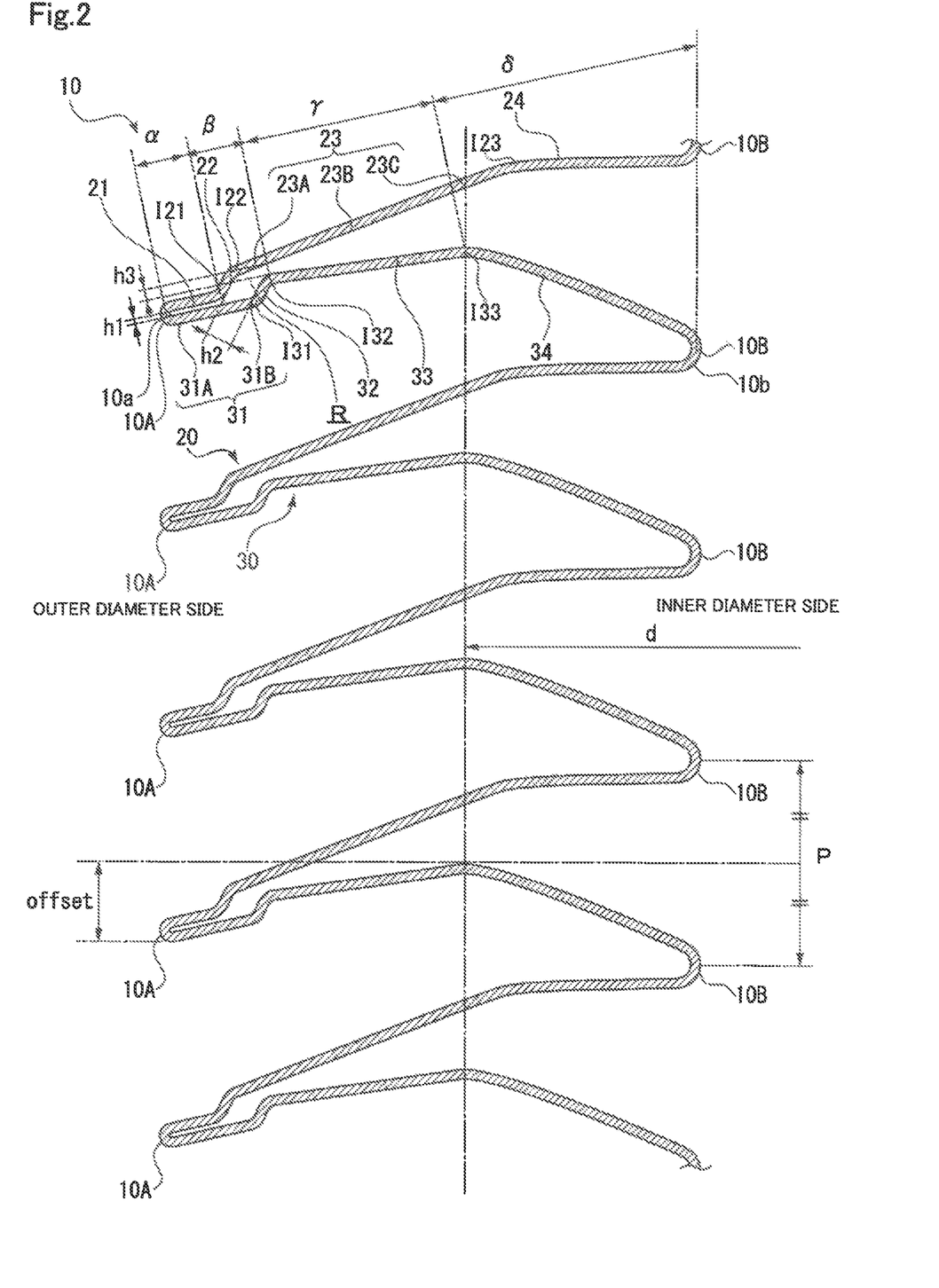
FIG. 2 is an axially half cross-sectional view of a principal part showing a free length state of the bellows of the first embodiment in an early stage of incorporation without expansion and contraction.

FIG. 2 shows a free length state of the bellows 10 in an early stage of incorporation without expansion and contraction, and the bellows 10 is in an annular shape when viewed from the axial direction, and has an accordion shape where crest parts 10A with U-shaped cross sections located on an outer diameter side and trough parts 10B with U-shaped cross sections located on an inner diameter side are repeatedly formed via slope parts 20, 30. A curvature radius of the crest parts 10A is formed to be smaller than that of the trough parts 10B.

Moreover, the crest part 10A is formed to be located in a position offset downward of FIG. 2 with respect to the center of a pitch P in the axial direction between the adjacent trough parts 10B, 10B on both sides. The corrugated shape of the bellows 10 is referred to as an "arch shape". Hereinafter, the offset direction is referred to as downward, and the direction opposite to offset is referred to as upward.

Next, the slope parts 20, 30 will be described.

As shown in FIG. 2, the upper slope part 20 is, sequentially from a side of the crest part 10A toward a side of the trough part 10B, formed by a linear outer diameter side element 21 inclined upward, a linear slant element 22 gently continuing to the outer diameter side element 21 while being bent upward in a counterclockwise direction in FIG. 2) at an inflection point I21, a linear intermediate element 23 gently continuing to the slant element 22 and extending slightly upward toward the inner diameter side while being bent downward (in a clockwise direction in FIG. 2) at an inflection point I22, and an inner diameter side element 24 in a shape gently continuing to the intermediate element 23 while being convexly bent upward at an inflection point I23. Further, the intermediate element 23 is, sequentially from the side of the crest part 10A toward the side of the trough part 10B, formed by a first intermediate element 23A, a second intermediate element 23B, and a third intermediate element 23C.

Moreover, the lower slope part 30 is, sequentially from the side of the crest part 10A toward the side of the trough part 10B side, formed by a linear outer diameter side element 31, a linear slant element 32 gently continuing to the outer diameter side element 31 while being bent upward at an inflection point I31, a linear intermediate element 33 gently continuing to the slant element 32 and extending parallel to the outer diameter side element 31 while being bent downward at an inflection point I32, and a linear inner diameter side element 34 gently continuing to the intermediate element 33 while being bent downward at an inflection point I33. Further, the outer diameter side element 31 is, sequentially from the side of the crest part 10A toward the side of the trough part 10B, formed by a first outer diameter side element 31A and a second outer diameter side element 31B.

As thus described, in the slope parts 20, 30, the outer diameter side elements 21, 31 are formed in parallel to each other, the separation distance between the intermediate elements 23, 33 gradually increases toward the inner diameter side, the slant elements 22, 32 are inclined at about 45 degrees with respect to the outer diameter side elements 21, 31 and extending in the same direction so as to be in parallel, to each other, and the inner diameter side elements 24, 34 are formed so as to be gradually separated from each other toward the trough parts 10B, 10B.

Moreover, the crest part 10A is formed to have a U-shaped cross section by being folded 180 degrees, and specifically, the outer diameter side elements 21, 31 are continuous to both ends of an outer diameter side tip part 10a formed to have a semi-arc shaped cross section, respectively. Moreover, the trough part 10B is formed to have a slightly opened U-shaped cross section by being folded about 150 degrees, and specifically, the inner diameter side elements 24, 34 are continuous to both ends of an inner diameter side tip part 10b formed to have an arc-shaped cross section, respectively.

Moreover, the inflection point I31 is formed on the inner diameter side than the inflection points I21 and I22, the inflection point I32 is formed on the inner diameter side than the inflection point I22, and the inflection point I33 is formed on the outer diameter side than the inflection point I23.

Moreover, an annular space F with a generally diamond-shaped cross section is defined by the slant element 22, the first intermediate element 23A, the slant element 32, and the second outer diameter side element 31B. In other words, the annular space B is defined by a folded part, which is formed by the slant element 22 and the first intermediate element 23A, of the slope part 20, and a folded part whose step is positioned on the inner diameter side than the folded part of the slope part 20 and which is formed by the second outer diameter side part 31B and the slant element 32.

It should be noted that the inflection point I33 is generally located on an effective diameter d (outer diameter of bellows/2+inner diameter of bellows/2), but is not limited thereto. It is only necessary that at least the annular space R is formed on the outer diameter side than the effective diameter d.

Here, a section from the crest part 10a to the inflection point I21 along the extending direction of the both slope parts 20, 30 leading to the crest part 10A is referred to as a first portion α, a section from the inflection point I21 to the inflection point I32 is referred to as a second portion β, a section from the inflection point I32 to the inflection point I33 is referred to as a third portion γ, and a section from the inflection point I33 to the trough parts 10B, 10B is referred to as a fourth portion δ.

That is, the both slope parts 20, 30 leading to the crest part 10A comprise the first portion α (the outer diameter side element 21, the first outer diameter side element 31A), the second portion β (the slant element 22, the first intermediate element 23A, the second outer diameter side element 31B, the slant element 32), the third portion γ (the second intermediate element 23B, the intermediate element 33), and the fourth portion δ (the third intermediate element 23C, the inner diameter side element 24, the inner diameter side element 34) which sequentially smoothly continue one another from the crest part 10A side toward the adjacent trough parts 10B, 10B. Moreover, the slope parts 20, 30 are formed in almost parallel to each other in each of the first portion α, the second portion β, and the third portion γ.

Moreover, the both slope parts 20, 30 is formed such that a separation distance h2 between the second portions β is longer than a separation distance h1 between the first portions α and a separation distance h3 between the third portions γ (h2>h1, h3, preferably h2>h3>h1). That is, the length h2, which is orthogonal to the extending direction of the slope parts 20, 30, of the annular space R formed between the second portions β is long, and thus the annular space R has a large capacity The separation distance is a distance in a direction orthogonal to the extending direction of the respective portions of the slope parts 20, 30, the separation distance on the second portion β side in the radial direction (in the third portions γ, the separation distance at the inflection point I32) may be used in the portions which are not in parallel to each other, and an average value of the separation distances in the radial direction may be used in the second portions β.

Next, operations and effects of the bellows 10 will be described.

Figure 3:
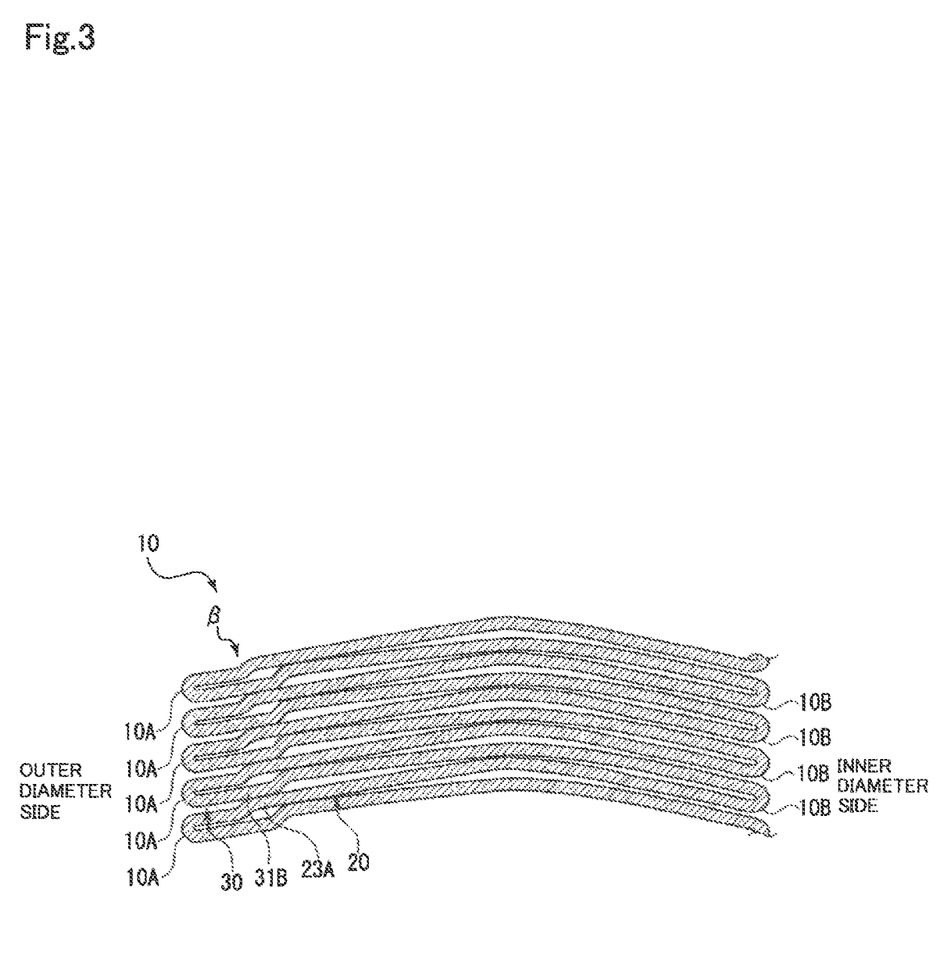
FIG. 3 is an axially half cross-sectional view of the principal part showing a close-contact length state of the bellows of the first embodiment.

The bellows 10 contracts when received an external force in the axial direction, and is capable of contracting to a close-contact state shown in FIG. 3 in the most contracted state. When the bellows 10 contracts from the free length state of FIG. 2 to the close contact state of FIG. 3, the adjacent trough parts 10B approach to each other in the axial direction and at the same time the adjacent crest parts 10A approach to each other, and the adjacent second portions β (the second outer diameter side elements 31B of the slope part 30 of the upper pleat and the second intermediate element 23B of the slope part 20 of the lower pleat) contact with each other, which results in a close contact state. In the close contact state, since large portions of the slope parts are not in contact with each other, linearity and small hysteresis of a compressive load curve can be secured. Moreover, in the close contact state and a process leading to the close contact state, an external force acts on the second portions β, the adjacent crest parts 10A are not in contact with each other and separated slightly, and the shapes of the crest parts 10A are almost maintained, and therefore durability of the crest parts 10A is excellent.

Figure 4:
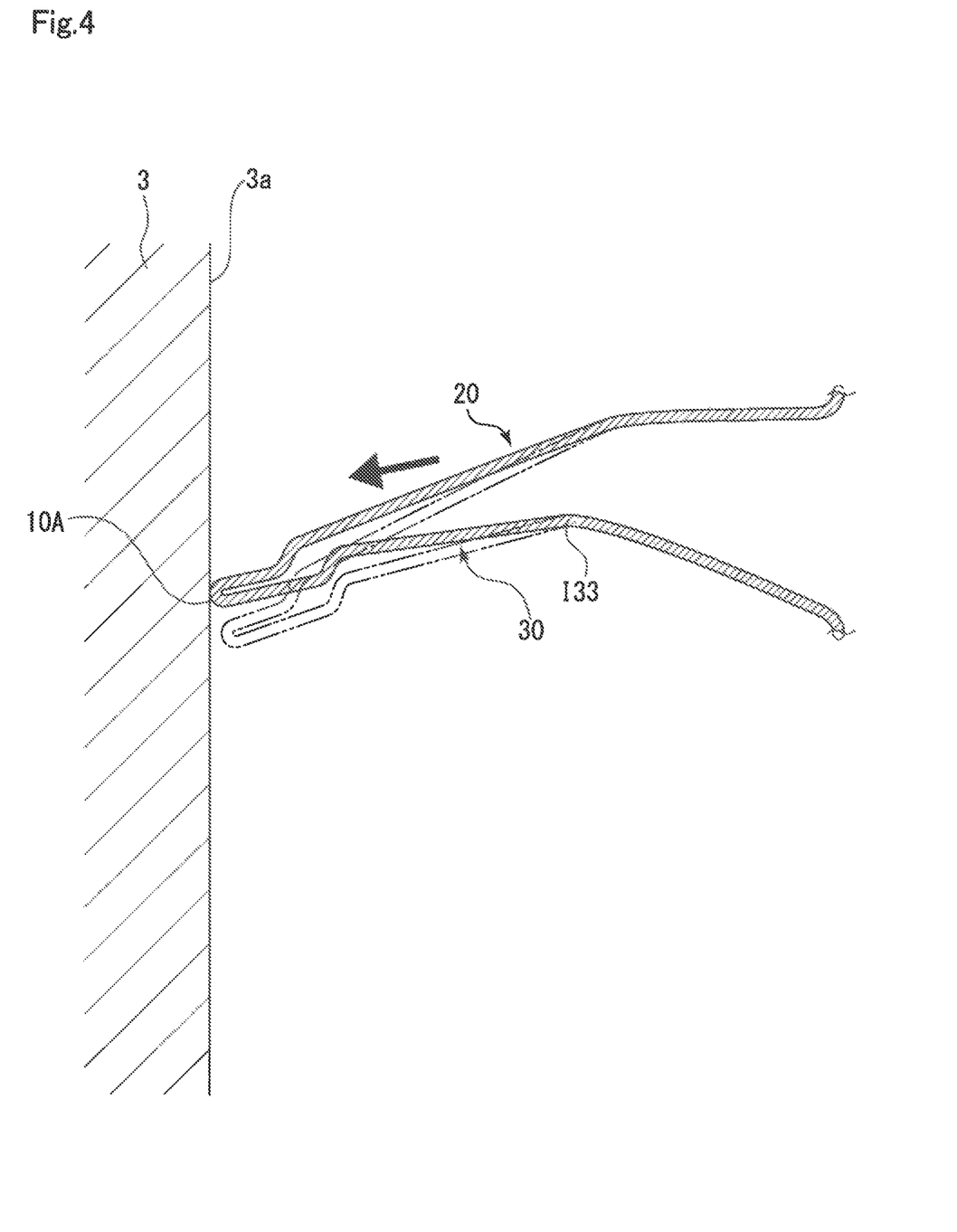

With reference to FIG. 2 and FIG. 4, at the time of vibration, and expansion and contraction of the bellows 10, when the crest parts 10A of the bellows 10 strikes the opposing inner wall surface 3a of the shell 3 or the like in the direction shown by an arrow, an oil canning phenomenon can be avoided because of the arch shapes of the slope parts 20, 30, and the trough parts 20, 30 are deformed such that the outer diameter sides thereof are bent downward in the axial direction (see, a dashed line in the figure) and the crest parts 10A can escape downward in the axial direction. Therefore, an impact to the crest parts 10A can be mitigated.

Further, since the separation distance h3 between the third portions γ is set to be short, the slope parts 20, 30 are likely to be deformed so as to be bent downward starting at the inflection points I21, I22, I31, and I32.

In addition, since the slant elements 22, 32 are inclined respectively from upward to downward (to the offset side) when viewed from the inner diameter side to the outer diameter side, the slope parts 20, 30 are likely to be deformed so as to be bent downward. It should be noted that, as shown in a modified example of FIG. 6, the slant elements 22, 32 may be inclined respectively from downward to upward (to the side opposite to offset) when viewed from the inner diameter side to the outer diameter side.

Figure 5:
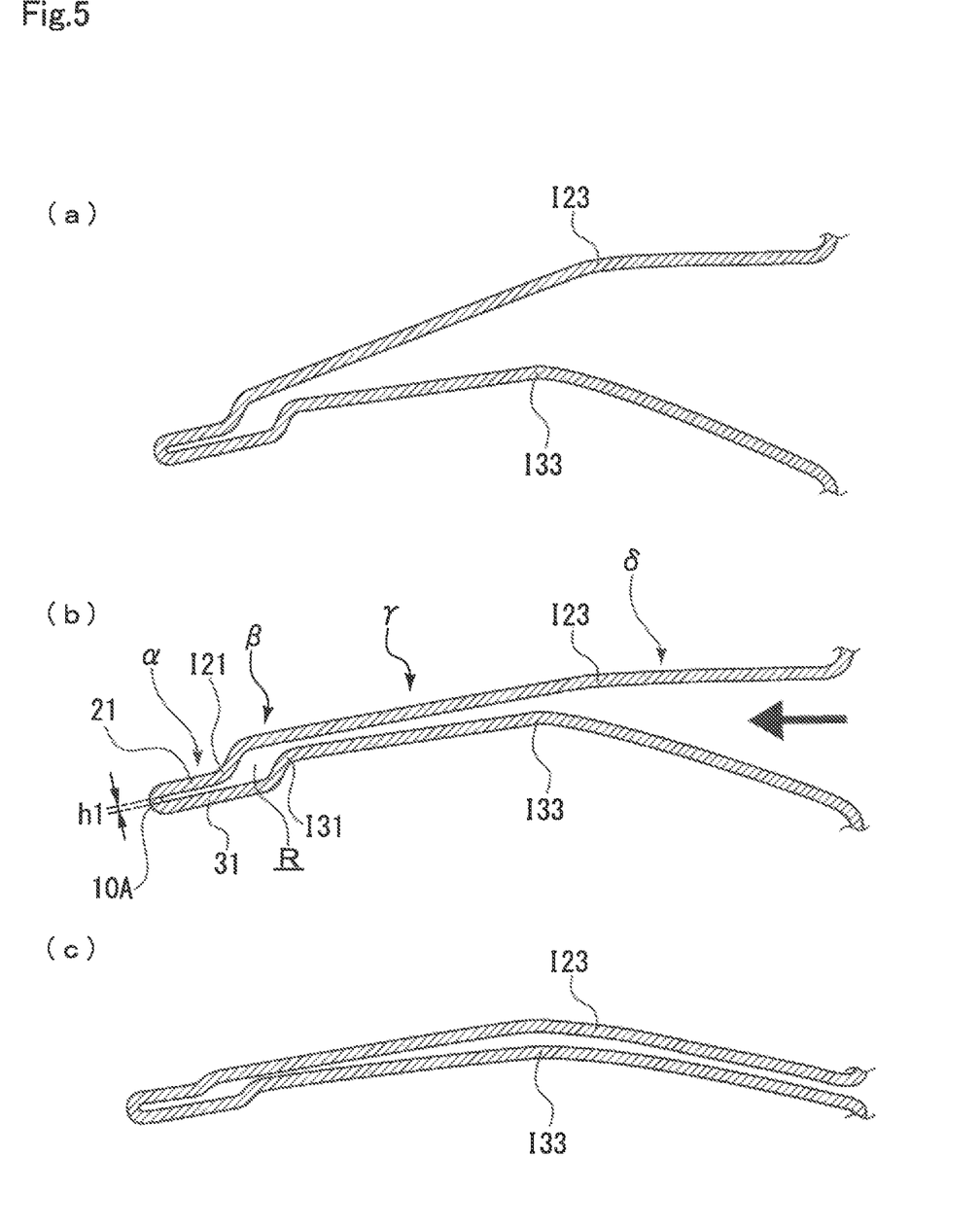
FIG. 5 is a diagram illustrating the state of the bellows of the first embodiment when expanded and contracted.

Referring to FIG. 2 and FIG. 5, in focusing on the crest parts 10A at the time of expansion and contraction of the bellows 10, since the separation distance h2 between the second portions β of the both slope parts 20, 30 are set to be longer than the separation distance h1 between the first portions α and the separation distance h3 between the third portions γ, the first portions α and the crest parts 10A are hardly to be deformed, and the portions (the third portions, the fourth portions) on the inner diameter side of the slope parts 20, 30 are deformed. Therefore, a stress due to cyclic deformation does not act on the crest parts 10A.

Moreover, since the curvature radius of the crest parts 10A is small and the separation distance h1 between the first portions α is small, at the time of contraction of the bellows 10, there is no contact in the axial direction between the crest parts 10A and 10A or between the outer diameter side elements 21 and 31 constituting the first portions (see FIG. 3), a close contact length can be shortened, and the expansion and contraction margin of the bellows 10 can be enlarged.

Moreover, when the pressure in the pressure piping is increased and the bellows 10 expands from the state of zero-down of FIG. 5C, the liquid pressure inside the bellows 10 becomes transiently higher than the gas pressure outside the bellows 10, and the liquid tries to flow toward the outer diameter side from the inner diameter side within the bellows 10 (see, the arrow), but the first portions α and the crest parts 10A are hardly to be deformed also in this case for the following reasons.

Firstly, the slope parts 20, 30 are deformed at the inflection points I23, I33.

Secondly, not only the third portions γ whose separation distance h3 is small exist on the inner diameter side than the annular space R, but also the separation distance between the intermediate elements 23, 33 is gradually increased toward the inner diameter side, and therefore, when the liquid flows in the annular space R, the slope parts 20, 30 are deformed in the vicinities of the inflection points I21, I31 before the crest parts 10A is expanded.

Thirdly, in the first portions α, since the outer diameter side elements 21, 31 are in parallel to each other, a so-called wedge action is less likely to occur at the time of inflow of the liquid.

Fourthly, the separation distance h1 between the first portions α is small, and the curvature radius of the crest parts 10A is small.

Moreover, during abnormal contraction in a case where the backup fluid is leaked due to sealing failure or the like of the seal member 8 in a zero-down state of the accumulator 1, the crest parts 10A are hardly deformed because their curvature radius is small and their rigidity is high. Therefore, since a stress due to cyclic deformation does not act on the crest parts 10A, the durability of the crest parts 10A can be improved.

Moreover, since, during the abnormal contraction described above, the slope parts 20, 30 are in a slimmed-down state closer to each other due to gas pressure, and are almost not in contact with each other, linearity and small hysteresis of a compression load curve can be secured.

Hereinbefore, although the embodiments of the present invention have been described by the drawings, its specific configuration is not limited to these embodiments, and any changes and additions made without departing from the scope of the present invention are included in the present invention.

For example, the embodiments have been described in the case where the bellows 10 is attached to the accumulator 1 having the stay 6, but are not limited thereto, and the bellows may be attached to an accumulator, for example, in which an upper end of the bellows is liquid-tightly fixed to a gas filling member and a lower end thereof is liquid-tightly fixed to a bellows cap. Moreover, the working fluid of the accumulator 1 has been illustratively described as a liquid, but is not limited thereto, and may be, for example, a gas. In this case, the liquid chamber L may be a gas chamber.

Moreover, the embodiments have been described in the case where the bellows 10 is attached to the accumulator 1, but are not limited thereto, and the bellows can be used in a pipeline.

Moreover, in the embodiments, the crest parts 10A and the trough parts 10B have been described as each having an arc shape with a constant curvature radius, but do not necessarily need to have an arc shape with a completely constant curvature radius, and the arc shape may be, for example, an arc in which the curvature varies in the middle such as an elliptic arc.

Moreover, the embodiments have been described in the case where the outer diameter side elements 21, 31, the intermediate elements 23, 33, and the inner diameter side elements 24, 34 are all linear, but other shapes, such as a gentle curved shape may be possible.

Moreover, in the embodiments, the outer diameter side elements 21, 31 have been described as being in parallel to each other, but are not limited thereto. The same applies to the intermediate elements 23, 33.

Moreover, the embodiments have been described in the case where the slant elements 22, 32 are inclined at about 45 degrees, but the inclination angle is not limited to 45 degrees.

Moreover, the embodiments have been described in the case where the lengths of the slant element 22, the first intermediate element 23A, the slant element 32, and the second outer diameter side element 31B are approximately equal and the annular space R has a generally diamond shape, but these lengths and the cross-sectional shape of the annular space are not limited thereto.

Figure 6:
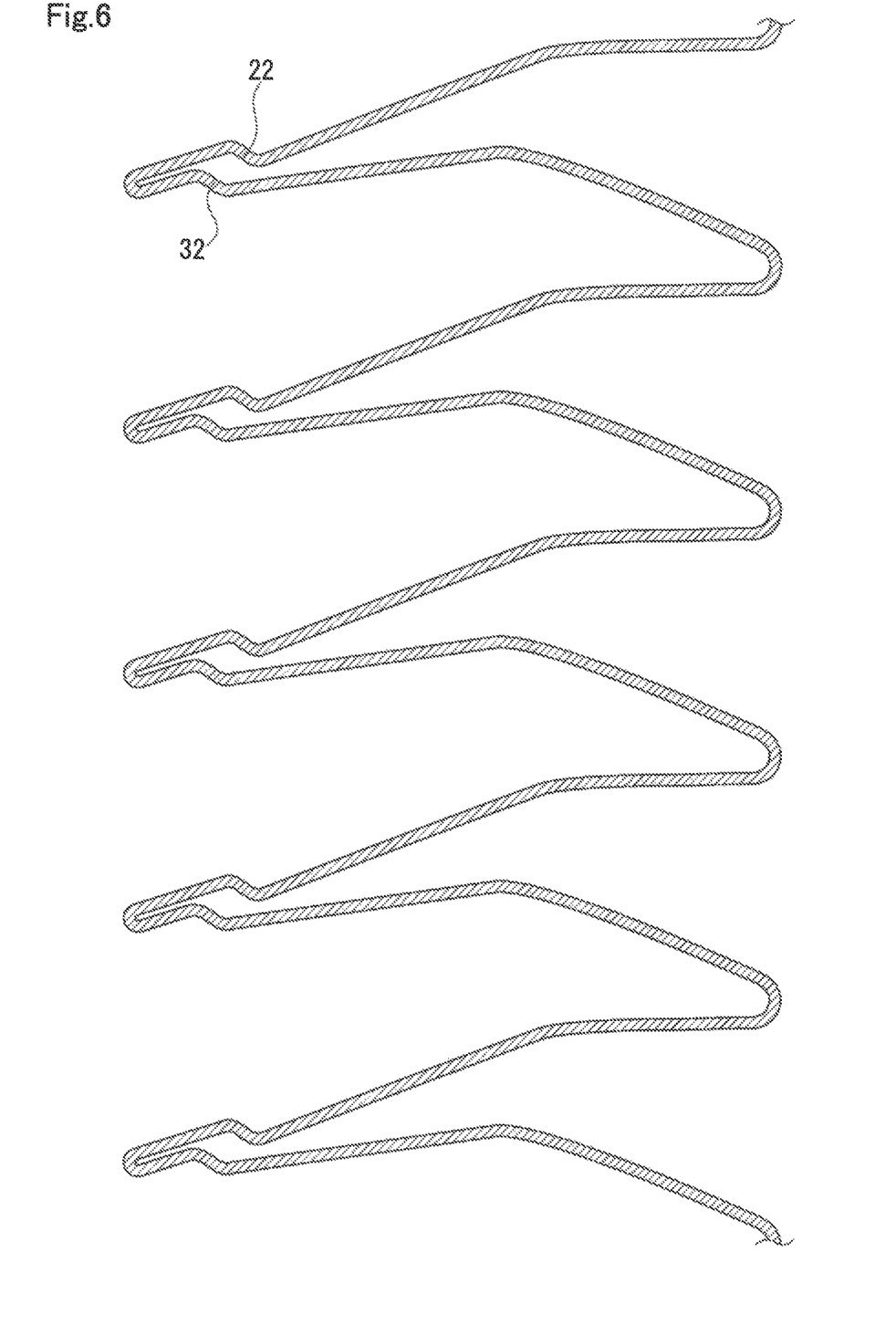
FIG. 6 is an axially half cross-sectional view of a principal part showing a free length state of a bellows which is shown as a modified example of the first embodiment in an early stage of incorporation without expansion and contraction.

Moreover, although the embodiments have been described in the case where the slant elements 22, 32 are inclined respectively from upward to downward (to the offset side) when viewed from the inner diameter side to the outer diameter side, as shown in the modified example of FIG. 6, the slant elements 22, 32 may be inclined respectively from downward to upward (to the side opposite to offset) when viewed from the inner diameter side to the outer diameter side.

REFERENCE SIGNS LIST

1 Accumulator
3 Shell
3a inner wall surface
6 Stay
7 Bellows cap
8 Seal member
10 Bellows
10A Crest part
10B Trough part
20, 30 Slope part
G Gas chamber
L Liquid chamber
I21, I22 Inflection point
I31, I32 Inflection point
R Annular space
h1 Separation distance between first portions
h2 Separation distance between second portions
h3 Separation distance between third portions
α First portion
β Second portion
γ Third portion
δ Fourth portion

The invention claimed is:

1. A bellows in an accordion shape where crest parts with U-shaped cross sections and trough parts with U-shaped cross sections are repeatedly formed via slope parts in a view from outside, wherein
  adjacent two of the slope parts leading to one of the crest parts comprise first portions, second portions, third portions, and fourth portions, respectively, which are continuously connected, in description order, to one another from the crest part toward adjacent two of the trough parts,
  in a free length state of the bellows, a separation distance between the second portions of the adjacent two of slope parts is longer than separation distances between the first portions and between the third portions of the adjacent two of the slope parts; and
  the second portions of the adjacent two of the slope parts have slant elements inclined with respect to the first portions and the third portions and extending in a same direction so that an annular space partially defined by the slant elements.

2. The bellows according to claim 1, wherein curvatures of both ends of each of the slant elements are reversed.

3. The bellows according to claim 2, wherein each of the crest parts is formed by being folded 180 degrees.

4. The bellows according to claim 3, wherein the crest part is provided at a position offset with respect to a center position between the adjacent two of the trough parts on both sides of the crest part.

5. The bellows according to claim 2, wherein the crest part is provided at a position offset with respect to a center position between the adjacent two of the trough parts on both sides of the crest part.

6. The bellows according to claim 1, wherein the crest part is provided at a position offset with respect to a center position between the adjacent two of the trough parts on both sides of the crest parts, and the slant elements are inclined in a direction which assists an offset of the crest part.

7. The bellows according to claim 1, wherein each of the crest parts is formed by being folded 180 degrees.

8. The bellows according to claim 7, wherein the crest part is provided at a position offset with respect to a center position between the adjacent two of the trough parts on both sides of the crest part.

9. The bellows according to claim 1, wherein the crest part is provided at a position offset with respect to a center position between the adjacent two of the trough parts on both sides of the crest part.

\* \* \* \* \*